United States Patent
Kulaga et al.

(10) Patent No.: US 12,067,115 B2
(45) Date of Patent: Aug. 20, 2024

(54) MALWARE ATTRIBUTES DATABASE AND CLUSTERING

(71) Applicant: Acronis International GmbH, Schaffhausen (CH)

(72) Inventors: Andrey Kulaga, Istanbul (TR); Nikolay Balakin, Istanbul (TR); Maxim Davydov, Istanbul (TR); Nikolay Grebennikov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 343 days.

(21) Appl. No.: 17/449,608

(22) Filed: Sep. 30, 2021

(65) Prior Publication Data
US 2023/0098919 A1  Mar. 30, 2023

(51) Int. Cl.
*G06F 21/56* (2013.01)
*G06F 16/28* (2019.01)

(52) U.S. Cl.
CPC .......... *G06F 21/565* (2013.01); *G06F 16/285* (2019.01); *G06F 2221/034* (2013.01)

(58) Field of Classification Search
CPC . G06F 21/565; G06F 16/285; G06F 2221/034
See application file for complete search history.

(56) References Cited

U.S. PATENT DOCUMENTS

| | | | | |
|---|---|---|---|---|
| 7,530,106 | B1 * | 5/2009 | Zaitsev | G06F 21/577 |
| | | | | 713/188 |
| 8,775,333 | B1 | 7/2014 | Zahn | |
| 8,826,439 | B1 * | 9/2014 | Hu | G06F 21/56 |
| | | | | 726/24 |
| 10,437,507 | B2 | 10/2019 | Tormasov et al. | |
| 10,817,542 | B2 | 10/2020 | Aseev et al. | |
| 10,846,403 | B2 | 11/2020 | Finkelshtein et al. | |
| 10,880,328 | B2 | 12/2020 | Farhady et al. | |
| 10,885,188 | B1 | 1/2021 | Batur | |
| 11,159,547 | B2 | 10/2021 | Chari et al. | |
| 11,645,387 | B2 * | 5/2023 | Seo | G06F 21/563 |
| | | | | 726/23 |
| 11,689,561 | B2 * | 6/2023 | Seifert | G06N 3/045 |
| | | | | 726/24 |
| 2007/0056035 | A1 * | 3/2007 | Copley | G06F 21/562 |
| | | | | 726/22 |
| 2010/0192222 | A1 * | 7/2010 | Stokes | G06F 21/563 |
| | | | | 703/23 |
| 2012/0260342 | A1 * | 10/2012 | Dube | G06F 21/564 |
| | | | | 726/24 |

(Continued)

FOREIGN PATENT DOCUMENTS

JP  2023003363 A * 1/2023 ........... G06F 21/554
KR  20190073255 A   6/2019

(Continued)

*Primary Examiner* — Mohammed Waliullah
(74) *Attorney, Agent, or Firm* — ESPE Legal Consultancy FZ-LLC

(57) ABSTRACT

A system and method for detecting malware using hierarchical clustering analysis. Unknown files classified by clustering and in view of known malicious and known safe files. Machine learning models and detection rules are used to enhance classification accuracy.

6 Claims, 4 Drawing Sheets

(56) References Cited

U.S. PATENT DOCUMENTS

| | | | |
|---|---|---|---|
| 2012/0317645 A1* | 12/2012 | Fortier | G06F 21/566 726/24 |
| 2015/0089647 A1* | 3/2015 | Palumbo | G06F 21/564 726/23 |
| 2020/0082083 A1 | 3/2020 | Choi et al. | |
| 2020/0175152 A1* | 6/2020 | Xu | G06F 21/53 |
| 2021/0406109 A1 | 12/2021 | Kulaga et al. | |

FOREIGN PATENT DOCUMENTS

| | | |
|---|---|---|
| KR | 20200109677 A | 9/2020 |
| KR | 20210089849 A | 7/2021 |
| RU | 2018147233 A | 6/2020 |
| RU | 2739865 C2 | 12/2020 |

* cited by examiner

Obtained results on training sample 302

|  | Clusters | Files |
|---|---|---|
| Total 310 | 8122 | 39641 |
| Safe 312 | 5976 | 17216 |
| Malicious 314 | 2127 | 22354 |
| Both classes 316 | 19 | 71 |

FIG. 3A

Cluster statistics on test sample 304

|  | Total | Safe | Malicious |
|---|---|---|---|
| From existing clusters 320 | 1635 | 311 | 1324 |
| From new clusters 322 | 669 | 187 | 482 |
| Total classified 324 | 2304 | 498 | 1806 |

FIG. 3B

Cluster statistics on test sample 306

| Actual/Predicted | Safe | Malicious |
|---|---|---|
| Safe 330 | 460 | 38 |
| Malicious 332 | 30 | 1776 |

FIG. 3C

| Results of using clustering for identifying packing algorithms 402 ||||||
|---|---|---|---|---|---|---|
| Packer 404 | All files 406 | Clusters 408 | All files in the received clusters 410 | Files using this packer in clusters 412 | Classification accuracy 414 | Correct proportion of clustered files 416 |
| none | 26,246 | 676 | 23,891 | 23,555 | .986 | .897 |
| .net | 6,053 | 564 | 5,087 | 4,648 | .914 | .768 |
| bobsoft | 3,268 | 46 | 3,179 | 3,162 | .995 | .968 |
| armadillo | 2,907 | 115 | 2,366 | 2,362 | .998 | .813 |
| petite | 1,857 | 2 | 1,846 | 1,846 | 1.0 | .994 |
| dislg | 922 | 7 | 956 | 915 | .957 | .992 |
| upx | 913 | 5 | 812 | 667 | .821 | .731 |
| vmprotect | 396 | 396 | 310 | 310 | 1.0 | .783 |
| mpress | 332 | 318 | 318 | 318 | 1.0 | .958 |
| aspack | 101 | 75 | 75 | 70 | .933 | .693 |
| pecompact | 87 | 83 | 83 | 83 | 1.0 | .954 |

FIG. 4

MALWARE ATTRIBUTES DATABASE AND CLUSTERING

TECHNICAL FIELD

The invention pertains to computer systems and the detection of malware and unauthorized activity within those systems.

Background

Malicious software penetrates and harms computer systems without the knowledge or consent of the owners. Malware is an ongoing problem in computer security. Attackers have the advantage over defenders because only one vulnerability needs to be found to compromise a system. It is widely understood that keeping system software updated greatly improves security, yet even fully updated systems are vulnerable to zero-day attacks. Despite best efforts to detect exploits quickly and update client systems, cybersecurity defenders always lag behind attackers to some degree. The longer the lag, the more vulnerable client networks become, even when best practices for cybersecurity have been implemented. Estimates suggest that financial losses by companies subjected to attacks amount to billions of dollars each year.

One of the traditional approaches to detecting malicious programs is to compare the signatures of the files under investigation. When antivirus companies detect a new sample, they analyze it and create signatures that are released as an update to clients. At the same time, analysis and updating usually take a long time, during which malware continues to pose a threat.

In addition, modern malware has several polymorphic layers, uses code packaging, obfuscation and other methods to complicate detection and analysis. For a given sample, there can be hundreds or thousands of automatically generated variants.

Faster and more efficient methods of detecting and classifying new samples are needed to compensate for the ever-increasing number of malware variants.

Summary

A system for detecting malware and the use of code packing algorithms based on static attributes using partial learning and real-time learning. The main problem with clustering is scalability. Classical clustering algorithms usually have a complexity higher than linear, for example, DBSCAN and Hierarchical clustering algorithms have time complexity $o(n^2)$ and $o(n^3)$ respectively, where n is the number of objects.

This problem is solved by using a probabilistic algorithm for finding similar objects, MinHash Locality Sensitive Hashing (LSH), which has sublinear complexity. MinHash, a min-wise independent-permutations locality-sensitive hashing scheme, is a technique for quickly estimating how similar two sets are. It is used to search for groups of objects with a distance below the specified threshold $t_{LSH}$, which is set during initialization. Further, on the obtained subsets of objects, referred to as "rough clusters," the already selected exact clustering algorithm is launched. Costly computations on all data are not needed. Instead, accurate clustering is performed only on a small sample at the cost of an insignificant loss of accuracy. If the sample size is limited, linear complexity is achieved from the number of features.

Rough clustering does not require specifying the number of clusters, which may be unknown at the outset. Instead, the method relies on a threshold for distance between objects and agreement on the distance thresholds when performing coarse and fine clustering.

SUMMARY OF FIGURES

FIGS. 3A, 3B, and 3C show exemplary results obtained by way of an embodiment of the invention FIG. 4 shows exemplary results obtained from an embodiment of the invention used to identify packing algorithms.

DETAILED DESCRIPTION

Figure 1:
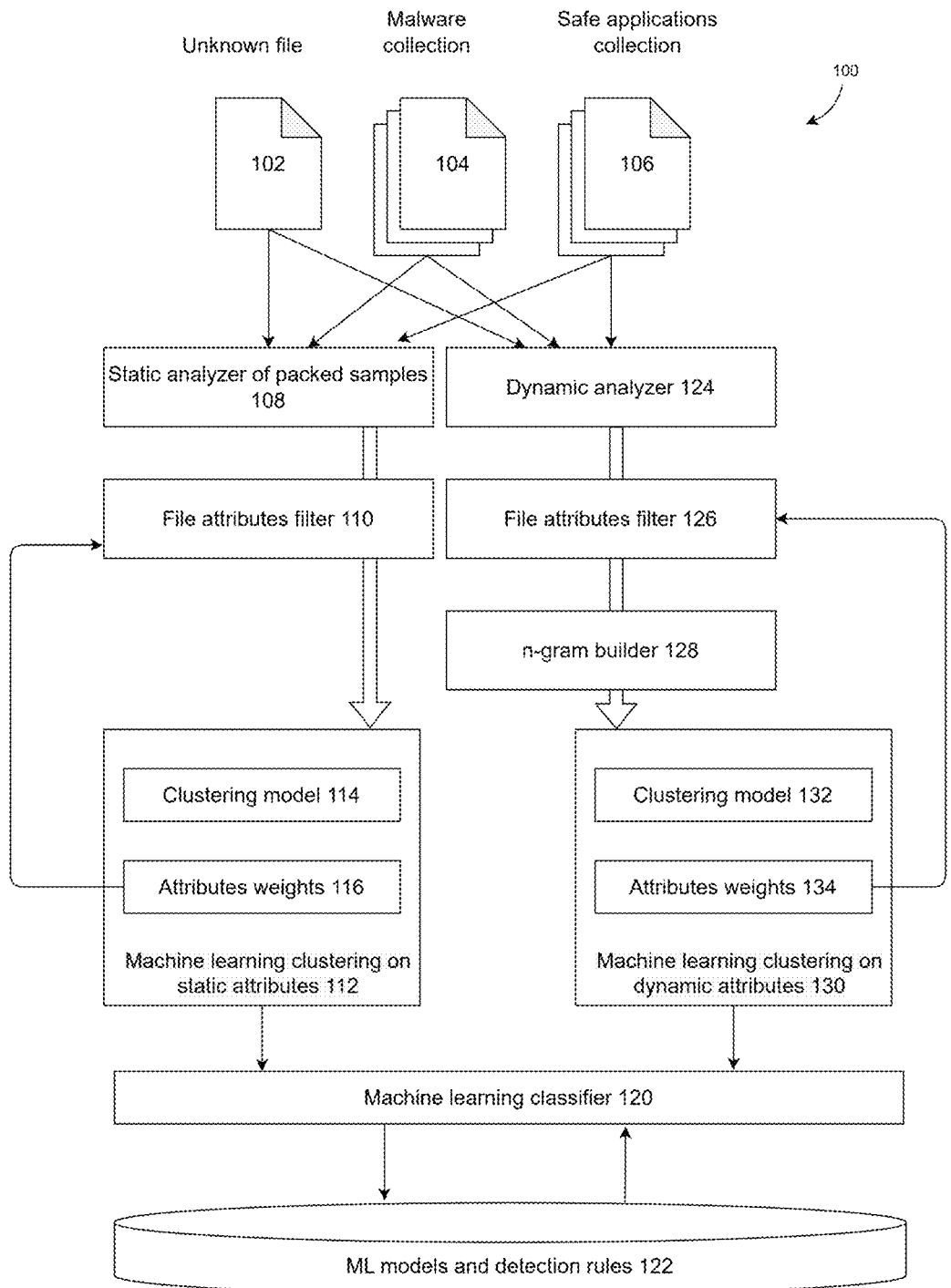
FIG. 1 shows the components and interactions of a system embodying the invention.

A system for implementing a scalable partial learning algorithm is applied to computer files and clusters for automatic attribute-based detection of malicious software and code packers.

Malicious software can be detected with high accuracy and code families can be automatically highlighted based on strings extracted from files. N-gram opcodes are used to define the code packing algorithm to be used. This system can be used for automatic marking of new software samples and identification of families, which greatly simplifies and speeds up the analysis.

The system employs machine learning malware classification based on static and dynamic file analysis; clustering files based on groups of files, grouped by statistical similarity of file attributes; filtering attributes by the input in the classification; and detecting packer type using the code structure of malicious files.

In an embodiment, agglomerative (hierarchical) clustering is used as the clustering algorithm. The algorithm operates as follows:

1. All objects are initially considered to be clusters.
2. There is a pair of clusters with a minimum distance between them.
3. The found pair is combined into 1 cluster.
4. Repeat 2 and 3.

The process is repeated until the number of clusters after point 3 reaches the minimum threshold, or until the distance between clusters in point 2 does not exceed the threshold.

Since objects are sets, the Jaccard measure is used as a measure of similarity. It is calculated by the following formula, where A and B are sets, and at least one is not empty, or $$(A, B) = \frac{A \cap B}{A \cup B}$$

where A and B are sets, and least one is not empty, or (A,B)=1. Accordingly, the distance is $$dist(A, B) = 1 - \frac{A \cap B}{A \cup B}$$

to create a compact representation of sets and a MinHash algorithm was used for quick approximate calculation of distances. The main problem with clustering is scalability.

Classical clustering algorithms usually have a complexity higher than linear, for example, DBSCAN and Hierarchical clustering algorithms have time complexity $o(n^2)$ and $o(n^3)$ respectively, where n is the number of objects.

This problem is solved by using a probabilistic algorithm for finding similar objects, MinHash LSH, which has sublinear complexity.

Significant acceleration occurs due to the use of LSH (Locality sensitive hashing) as a coarse clustering algorithm. LSH performs sublinear searches for objects with $Jaccard_{sim}$ above the set threshold. This algorithm with a high probability hashes similar input objects into the same "baskets." Objects that have similarity above the set threshold s are considered to be similar. This method requires preliminary calculations that are linear in time, while the search for similar objects is constant in time. The algorithm is carried out with relatively swiftness. For example, expected times for preprocessing are about 17 seconds, while obtaining rough clusters takes about 12 seconds.

LSH is used to search for groups of objects with a distance below the specified threshold $t_{LSH}$, which is set during initialization. Further, on the obtained subsets of objects, which will be referred to as "rough clusters," a preselected exact clustering algorithm is launched. This reduces the need to perform costly computations on all available data because accurate clustering can be performed on a small sample with an insignificant loss of accuracy. If the sample size is limited, linear complexity can be achieved from the number of features.

Rough clustering does not require specifying the number of clusters, which is initially unknown. Instead, only a threshold for distance between objects is required. Agreement on the distance thresholds allows optimal results when performing coarse and fine clustering.

In an embodiment, partial training is used. The peculiarity of partial training is that not all objects have a target label. An obtained data set and the marked objects are used to define labels for unknown objects. To do this in a rule-based manner, a label is assigned to the cluster. An example of such labeling would be, for example, if most of the marked objects of the cluster belong to one class, and all objects in the cluster without a label belong to this class.

Usually, when using partial training, the proportion of tagged objects is small. Alternatively, however, a large tagged sample may be used to classify a relatively small test set. In some instances, the formation of a cluster without a label is possible. In such a case, its members are not classified.

In an embodiment, real-time learning is implemented. MinHash LSH is also used to quickly determine which known objects a new one looks like. This, as with clustering, avoids calculating distances for all known features by working with a small set.

When a new object arrives, it can be added to an existing cluster, form a new one, or remain unclustered. By remaining unclustered, the object does not belong to existing clusters and does not form new ones. In the first two cases, if the labels of the resulting clusters are known, the object can be immediately classified.

Thus, the proposed system makes it possible to automatically maintain up-to-date information on a large number of families of executable files, to single out new families, and to classify at least some of the new samples.

In an embodiment, a number of simple frequency filters are used: by frequency in safe files, in malicious files, in the entire sample, and if it is present in a certain number of objects of both classes.

Malware detection according to the invention exploits the properties of strings. For example, strings extracted from a file can be used to define a family. The strings.exe application from the sysinternals set of utilities is used to retrieve the strings. This utility scans the transmitted file for the presence of embedded UNICODE (or ASCII) strings, the length of which is 3 or more characters by default.

For example, distances between files and the same family are calculated for three known test file families, "7-zip," "GIMP," and "CPU-Z" and different values of the minimum number of characters. This determines the optimal minimum number of characters per line, for example, five printable characters. A lower value extracts more noise lines, and the distance between files of the same family grows large. With a larger value, fewer rows are retrieved and some of the information is lost, which is also undesirable because sets are at issue and their elements are checked for matches.

As an algorithm for exact clustering in this part of the work, Hierarchical clustering is used with the following parameters: the maximum distance between clusters for union–distance threshold=–0.5, the method for calculating the distances between clusters is linkage=average is the average value of the distances between objects from two clusters. Hierarchical clustering describes an algorithm that groups similar objects into groups, or "clusters." The algorithm's endpoint is a set of clusters, where each cluster is distinct from the other clusters and the objects within each cluster are similar to each other. For MinHash LSH, the threshold was set according to the fine clustering threshold: $t_{LSH}$=distance_threshold=0.5.

To classify files without a target label their cluster needs to be determined and whether the given family is safe or malicious. Labels are assigned to clusters only if all files belonging to the cluster have a label of the same class. In an embodiment, clusters that do not meet this criterion are excluded from consideration and not used for classification of new objects.

FIG. 1 shows an implementation of a system 100 for malware detection according to an embodiment of the invention using clustering. Unknown file 102 is analyzed in view of malware collection 104 and safe applications collection 106. Static analyzer of packed samples 108 takes as input the unknown file 102, malware collection 104, and safe applications collection 106. A file attributes filter 110 is applied and the output is delivered for machine learning clustering based on static attributes 112. Clustering model 114 is applied to the samples as well as attributes weights 116. The output of clustering 112 is communicated to machine learning classifier 120, which classifies the results by comparison with machine learning models and detection rules 122. In parallel, dynamic analyzer 124 also receives unknown file 102, malware collection 104, and safe application collection 106. File attributes filter 126 is applied and output is delivered to n-gram builder 128. The output of n-gram builder 128 is communicated for machine learning clustering based on dynamic attributes 130. Dynamic clustering comprises application of clustering model 132 and attributes weights 134. The output of clustering 130 is communicated to machine learning classifier 120, which classifies the results by comparison with machine learning models and detection rules 122. In an embodiment, both static and dynamic analysis, attribute weights 116, 134 are communicated to their respective file attribute filters 110, 126.

Figure 2:
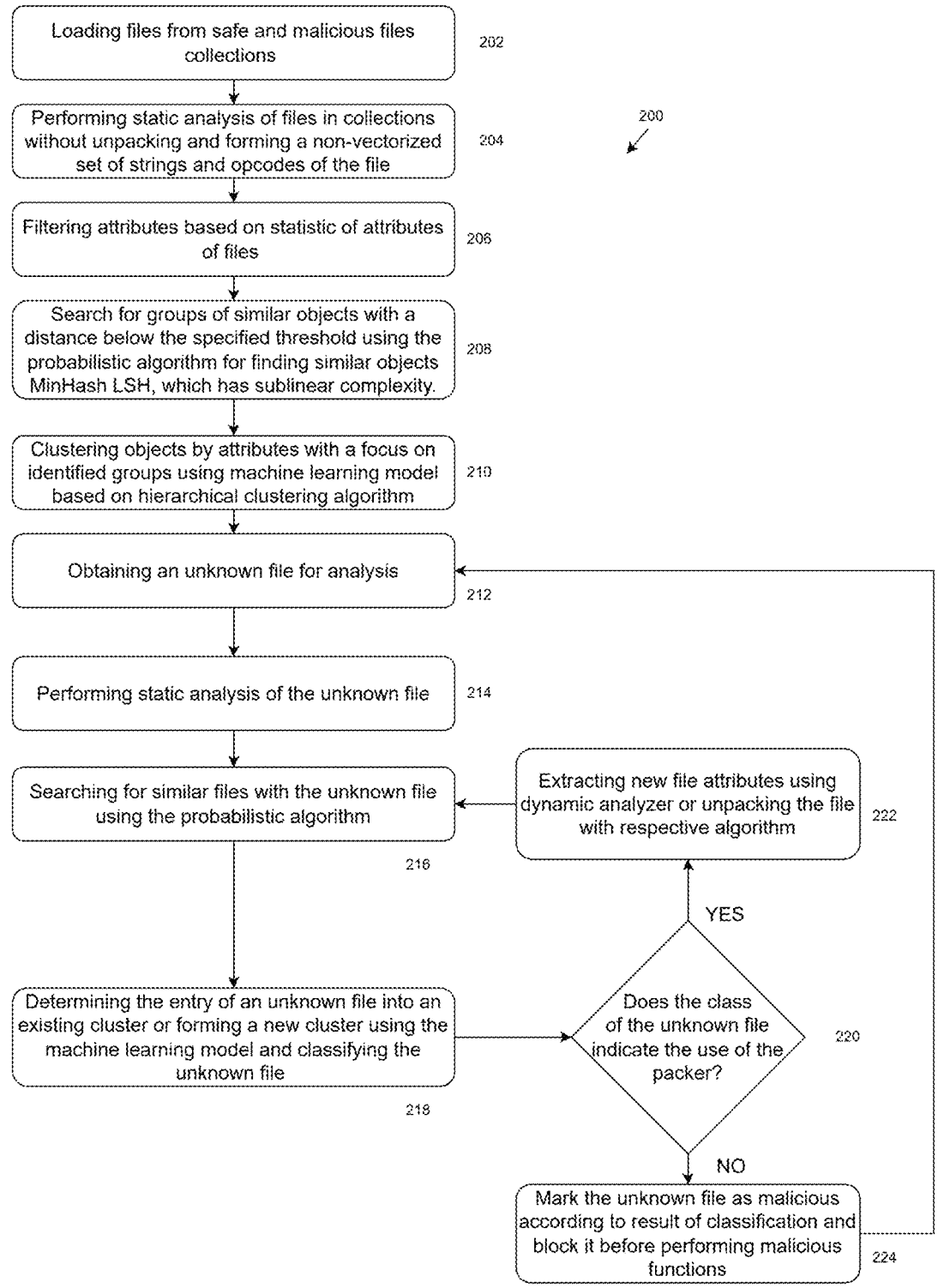
FIG. 2 shows exemplary method steps for implementing the invention.

FIG. 2 shows the steps 200 of a method carried out in accordance with an embodiment of the invention. At step 303, files are loaded from safe and malicious file collections.

At step 204, static analysis is performed on files in collections without unpacking and forming a non-vectorized set of strings and opcodes of the file. Then at step 206 attributes are filtered based on static file attributes. A search is conducted at step 208 for groups of similar objects with a distance below a specified threshold using a probabilistic algorithm for finding similar objects MinHash LSH, which has linear complexity. Objects are then clustered at step 210 with a focus on identified groups using a machine learning mode based on a hierarchical clustering algorithm. With this training completed, an unknown file is selected for analysis at step 212. Static analysis of the unknown file is performed at step 214. A search for files similar to the unknown file is performed using a probabilistic algorithm at step 216. From the results of this search, a determination is made whether to enter the unknown file into an existing cluster or forming a new cluster and the unknown file is classified at step 218. After classification, a decision is made based on whether the class of the unknown file indicates the use of file packing at step 220. If "yes," new file attributes are extracted using a dynamic analyzer at step 222. Alternatively, step 222 comprises unpacking the file with a corresponding algorithm. In either case, the new file attributes are returned to step 216 for searching for similar files. If step 220 results in a "no" answer, the unknown file is marked as malicious according to the classification results at step 224 and its performance of malicious functions is blocked.

In an embodiment, the size of the training sample is 74,180 non-empty files after filtering: 33826 malicious and 40354 safe. The size of the test sample is 19953: 9969 malicious and 9984 safe. Thus, the share of files that could be classified is 53.4%. Results 300 are shown in FIG. 3. The statistics obtained for clusters in this exemplary training sample are shown in table 302, where the results are grouped by totals in row 310, "safe" in row 312, "malicious" in row 314, and both classes in row 316. The share of classified files in clusters containing both types of files, which can be described as false positives, is only 0.18%.

The results of using the resulting structure for the classification of new objects are shown in table 304, showing statistics on files. Here the numbers of total files, safe files, and malicious files are shown correlated to rows for existing clusters 320, new clusters 322, and total classified 324. FIG. 3C shows an error matrix where row 330 shows the number of safe files classified as safe and malicious, while row 332 shows the number of malicious files classified as safe and malicious.

The disclosed method classified 11.5% of the files. At the same time, the classification accuracy is 97.0%, and the proportion of false positives is 7.6%.

Statistical differences can be explained by the fact that for the training sample, a single workstation was used as a source of safe files, and a labeled virus collection was used as a source of malicious files. The test sample consists entirely of random files.

In an embodiment, the system and method is used for detection of executable file packers. Executable file packing refers to compression of executable code. Packing allows code to be modified without changing the underlying function of the file. In other words, packing changes what executable code looks like without changing anything about a file's function. The clustering results for strings and n-grams of the sequence of opcodes differ significantly. N-grams of the sequence of opcodes are alternatively referred to as "n-grams of opcodes" or simply "opcodes." This difference in clustering results is expressed both in the number of files that could be clustered, and in the difference between the clusters obtained by rows and opcodes.

The results obtained are explained by the fact that when extracting n-grams of opcodes, unpacking of the packed code was not performed. A more detailed analysis showed that with this approach the clustering of packed files occurs not according to the software family, but according to the packing algorithm used. If code has not been packed, then clustering occurs by family, as in the case of using strings.

Code wrapping is a common malware technique used to avoid detection and complicate analysis. Malware "wrapped" with a legitimate file is configured so that upon execution, it extracts or installs the legitimate file along with the malware. Conventional programs also use packaging for size reduction and protection. This fact makes it difficult to detect malware directly, however, the task of determining the packaging algorithm used is in itself useful.

For clustering in this embodiment, hierarchical clustering is used with parameters: $t_{LSH}$=distance threshold=0.7, linkage='single' is the minimum distance between objects from two clusters. Cluster tags were assigned if more than half of its members belong to the same class.

In this exemplary embodiment, 43182 malicious files comprise a training sample. The results obtained for the 10 most common packers in the available data are presented in FIG. 4, which shows table 400 presenting results from using clustering for identifying packing algorithms 402. Column 404 shows the packers analyzed, column 046 shows the total number of files, and column 408 shows the number of clusters per packer. For each packer, table 400 further shows the total number of files in the received clusters 410 and the number of files using the packer in clusters 412. Classification accuracy for each packer is stated in column 414, while the correct portion of clustered files is given in column 416.

Out of 43182 files, 38989 were in clusters. Of these, 38001 (97.5%) are classified correctly. The results obtained demonstrate the possibility of determining the packing algorithm with a high accuracy by the proposed method.

The invention claimed is:

1. A system for malware detection for an unknown file in a computing environment with at least one processor, an unknown file, a malware file collection, and a safe file collection, the system comprising:
   a static analyzer and a first file attributes filter, under program control by the at least one micro-processor, the static analyzer configured to receive as input the unknown file, the malware collection, or the safe file collection;
   a dynamic analyzer and a second file attributes filter, under program control by the at least one micro-processor, the dynamic analyzer configured to receive as input the unknown file, the malware collection, or the safe collection;
   wherein the at least one micro-processor is further configured for program control of:
      a first clustering component, in communication with the static analyzer comprising a first clustering model and a first attributes weights module;
      a second clustering component in combination with the n-gram builder comprising a second clustering model and a second attribute weights module;
      a classifier for receiving the results of the first and second clustering components; and
      a library, in communication with the classifier, comprising a plurality of machine learning or detection rules;

wherein the unknown file is a packed file and the classifier identifies the unknown file as packed or not packed; and wherein the dynamic analyzer operates only on files identified as packed files.

2. The system of claim 1, wherein the dynamic analyzer under program control by the at least one micro-processor is configured to extract new file attributes from the packed file.

3. A method for malware detection for an unknown file in a computing environment with at least one processor, a malware collection, and a safe collection, the method comprising:

loading test files comprising known safe and known malicious files;

performing static analysis of a plurality of the test files without unpacking;

creating a non-vectorized set of strings and opcodes for the plurality of test files;

filtering attributes of the test files based on attribute statistics of the test files;

identifying groups of similar objects within the test files files using a probabilistic algorithm;

clustering the objects by attributes;

obtaining an unknown file for analysis and searching for similar files from among the test files using the probabilistic algorithm; and entering the unknown file into an existing cluster or forming a new cluster using at least one clustering model derived from the test files, classifying the unknown file and determining whether the unknown file's classification indicates the use of a packer;

wherein when the unknown file is a packed file and the unknown file is classified as packed or not packed; and wherein dynamic analysis is performed on the unknown file only if the unknown file is classified as packed.

4. The method of claim 3, further comprising the step of marking the unknown file as malicious if no packer is detected.

5. The method of claim 3, wherein the dynamic analyzer is configured to extract new file attributes from the packed file.

6. A system for malware detection for an unknown file in a computing environment with at least one processor, an unknown file, a malware file collection, and a safe file collection, the system comprising:

a first machine learning clustering component configured to classify the unknown file based on static attributes;

a second machine learning clustering component configured to classify packed unknown files based on dynamic attributes, wherein the second machine learning Clustering component is configured to extract new file attributes;

wherein the first and second machine learning clustering components are under program control by the at least one micro-processor: and a machine learning classifier, under program control by the at least one micro-processor, configured to operate on clusters and classify them based on a rules library comprising detection rules, wherein the second machine learning clustering component is configured to receive input from n-gram builder, wherein the second machine learning clustering component is configured to Clusters as packed or unpacked, and a first and second file attributes fitter coupled respectively to the first and second machine learning clustering components, wherein the first and second file attributes fitters under program control by the at least one micro-processor are configured for iterative filtering based on attribute weights received from the corresponding coupled machine learning clustering component.

* * * * *